United States Patent Office 3,047,611
Patented July 31, 1962

3,047,611
VINYL 2,2-DIHALOCYCLOPROPYL CARBOXYLATES
Carl Moore and William F. Tousignant, Midland, Mich., assignors to The Dow Chemical Company, Midland, Mich., a corporation of Delaware
No Drawing. Filed Oct. 3, 1961, Ser. No. 142,503
2 Claims. (Cl. 260—468)

This invention relates to vinyl esters of 2,2-dihalocyclopropane carboxylic acids corresponding to the general formula:

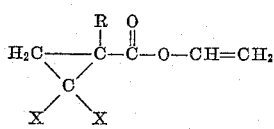

wherein X may be chlorine or bromine and R represents hydrogen or the methyl group. Additionally, it relates to the preparation of the said esters and to their use in rendering flame retardant certain resinous compositions.

The esters with which the present invention is concerned are readily prepared by the reaction between acetylene and the desired 2,2-dihalocyclopropane carboxylic acid which in turn may be prepared by the method of Woodworth and Skill, Journal of the American Chemical Society 79, 2543 (1957). Specifically, the esters are produced by the introduction of acetylene into a fluid body comprising the corresponding acid in the presence of a suitable catalyst consisting of a salt of a metal chosen from the group IIB elements of the periodic table of the elements. Preferably, the said fluid body is a molten mass of the corresponding acid. It may, however, consist of a solution of the said acid in an appropriate solvent such as benzene, xylene, toluene or dioxane.

In the preferred method the reaction necessarily is carried out at or above the melting point of the acid reactant. As the reaction proceeds, the temperature needed to maintain the reaction mixture in a fluid state becomes progressively lower so that the temperature of the reaction mixture may be gradually lowered. Accordingly, the temperature of reaction is generally of the order of magnitude of 120° C. initially and may drop to about 90° C. or even lower near completion of the reaction. If a solvent be employed the reaction may preferably be carried out at the temperature of reflux of the solvent.

The products of the invention are readily isolated from the reaction mixture by distillation under reduced pressure.

The vinyl 2,2-dihalocyclopropane carboxylates are readily copolymerizable with a variety of ethylenically unsaturated materials such as styrene and the like and are effective to lend flame retardant properties to the resulting copolymers.

The preparation and use of the products of the invention are illustrated by the following non-limiting examples wherein all parts and percentages are given on a weight basis.

*Example 1*

Into a reaction flask fitted with a controllable heating means, condenser, stirrer, a gas inlet and thermometer there was charged a mixture of 89 parts of 2,2-dibromo-1-methylcyclopropane carboxylic acid, 11.1 parts of mercuric acetate and 0.1 part of hydroquinone. The contents of the flask were heated to 120° C. to give a fluid mass. The stirrer was set in operation and acetylene was admitted below the surface of the fluid at such a rate that it was substantially completely absorbed. After 30 minutes, the temperature was lowered and maintained between 90° C. and 100° C. for 3.5 hours. An additional 2.0 parts of mercuric acetate were then added. Addition of acetylene at 90° C. was continued for an additional 2 hours. The reaction mixture was then filtered to give 74 parts of a light brown oily material. After the addition of 0.1 part of hydroquinone this material was distilled to give a clear liquid having a boiling point of 50°–54° C. at 0.6 mm. of mercury pressure and a refractive index of 1.5205 at 25° C. Infra-red spectrum analysis confirmed the structure

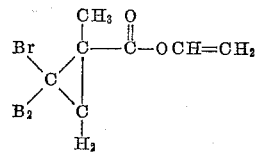

for the product.

*Example 2*

Into a glass pressure bottle there was charged a mixture of 50.4 parts of styrene, 1.0 part of vinyl, 2,2-dibromo-1-methylcyclopropyl carboxylate and 0.1 part of ditertiarybutyl peroxide. The air over the charge in the bottle was displaced by nitrogen. The bottle was then capped and placed in an oil bath maintained at 110° C. and kept there for a period of 20 hours. The resulting clear polymer was finely ground and devolatilized at 80° C. at 1–5 mm. of mercury pressure for 7 hours. From this final composition test bars were prepared by compression molding. These were found to be self extinguishing on ignition testing.

What is claimed is:
1. A compound of the formula:

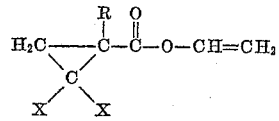

wherein R is a member of the group consisting of hydrogen and the methyl radical and X is a member of the group consisting of bromine and chlorine.

2. Vinyl 2,2-dibromo-1-methylcyclopropyl carboxylate.

No references cited.